US009226029B2

United States Patent
Kim et al.

(12) United States Patent  
(10) Patent No.: US 9,226,029 B2  
(45) Date of Patent: Dec. 29, 2015

(54) METHOD AND APPARATUS FOR CLIENT CAPABLE OF ACCESSING BROADCASTING NETWORK AND INTERNET NETWORK TO RECEIVE APPLICATION

(75) Inventors: Mun-jo Kim, Suwon-si (KR); Eun-hee Rhim, Suwon-si (KR); Soon-back Cha, Hwaseong-si (KR); In-chul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 338 days.

(21) Appl. No.: 12/836,004

(22) Filed: Jul. 14, 2010

(65) Prior Publication Data

US 2011/0016171 A1 Jan. 20, 2011

Related U.S. Application Data

(60) Provisional application No. 61/225,314, filed on Jul. 14, 2009, provisional application No. 61/302,595, filed on Feb. 9, 2010.

(30) Foreign Application Priority Data

Jun. 4, 2010 (KR) ........................ 10-2010-0053030

(51) Int. Cl.  
G06F 15/16 (2006.01)  
H04N 21/458 (2011.01)  
(Continued)

(52) U.S. Cl.  
CPC ....... *H04N 21/4586* (2013.01); *H04N 21/4622* (2013.01); *H04N 21/4782* (2013.01)

(58) Field of Classification Search  
CPC .......... H04N 21/4586; H04N 21/4782; H04N 21/4622

USPC ............. 709/203, 217, 218, 219; 725/63, 66, 725/136  
See application file for complete search history.

(56) References Cited

U.S. PATENT DOCUMENTS 6,557,171 B1 * 4/2003 Sonoda et al. ................ 725/136  
7,089,554 B2 * 8/2006 Shiomi et al. ..................... 718/1  
(Continued)

FOREIGN PATENT DOCUMENTS

CN 101090387 A 12/2007  
EP 1 848 214 A1 10/2007  
(Continued)

OTHER PUBLICATIONS

International Search Report (PCT/ISA/210) and Written Opinion (PCT/ISA/237) dated Feb. 7, 2011, in International Application No. PCT/KR2010/004578.

(Continued)

*Primary Examiner* — Kostas Katsikis  
(74) *Attorney, Agent, or Firm* — Sughrue Mion, PLLC (57) ABSTRACT

Provided are a method and an apparatus for a client, connected to a broadcasting network and an Internet network, to receive data for executing an application through the broadcasting network or the Internet network, according to information about the application received through the broadcasting network. The method includes: receiving information about the application from at least one of the through the broadcasting network; and receiving data for executing the application from at least one of the broadcasting network and the Internet network based on the received information about the application.

19 Claims, 7 Drawing Sheets

(51) Int. Cl.
*H04N 21/462* (2011.01)
*H04N 21/4782* (2011.01)

(56) References Cited

U.S. PATENT DOCUMENTS

| | | | |
|---|---|---|---|
| 7,552,228 B2 * | 6/2009 | Parasnis et al. | 709/231 |
| 8,490,143 B2 * | 7/2013 | Cedervall et al. | 725/109 |
| 2002/0054069 A1 * | 5/2002 | Britt et al. | 345/719 |
| 2002/0083447 A1 * | 6/2002 | Heron et al. | 725/38 |
| 2002/0087586 A1 * | 7/2002 | Yamagishi | 707/203 |
| 2002/0177437 A1 * | 11/2002 | Chesavage et al. | 455/426 |
| 2003/0046431 A1 * | 3/2003 | Belleguie | 709/246 |
| 2003/0054833 A1 | 3/2003 | Hayduk | |
| 2003/0121057 A1 * | 6/2003 | Singh | 725/132 |
| 2003/0177504 A1 * | 9/2003 | Paulo et al. | 725/118 |
| 2003/0217369 A1 | 11/2003 | Heredia | |
| 2004/0093619 A1 * | 5/2004 | Cox | 725/110 |
| 2005/0055458 A1 * | 3/2005 | Mohan et al. | 709/238 |
| 2006/0041509 A1 * | 2/2006 | Koerber | 705/51 |
| 2006/0285690 A1 * | 12/2006 | Jung | 380/237 |
| 2007/0039036 A1 * | 2/2007 | Sullivan et al. | 725/133 |
| 2007/0288984 A1 * | 12/2007 | Kim | 725/131 |
| 2008/0141327 A1 | 6/2008 | Oh et al. | |
| 2008/0216108 A1 | 9/2008 | Beaunoir et al. | |
| 2008/0235728 A1 | 9/2008 | Kim | |
| 2008/0301232 A1 * | 12/2008 | Facemire et al. | 709/205 |
| 2009/0066837 A1 * | 3/2009 | Choi et al. | 348/553 |
| 2009/0070811 A1 * | 3/2009 | Song et al. | 725/39 |
| 2009/0106806 A1 * | 4/2009 | Lee et al. | 725/110 |
| 2009/0172419 A1 * | 7/2009 | Takayama | 713/193 |
| 2011/0119547 A1 * | 5/2011 | Kim et al. | 714/748 |
| 2011/0165865 A1 * | 7/2011 | Gao et al. | 455/414.1 |
| 2011/0239263 A1 * | 9/2011 | Kim et al. | 725/110 |

FOREIGN PATENT DOCUMENTS

| | | | |
|---|---|---|---|
| EP | 1 940 057 A2 | 7/2008 | |
| WO | WO 2007143933 A1 * | 12/2007 | H04N 5/44 |

OTHER PUBLICATIONS

Communication dated Feb. 14, 2013 issued by the European Patent Office in counterpart European Patent Application No. 10800031.6.
Jean-Claude Dufourd, "International Organisation for Standardisation Organisation Internationale De Normalisation", Coding of Moving Pictures and Audio, ISO/IEC/JTC1/SC29/WG11, Jun. 2009, 36 pgs total, XP030045174.
Communication dated Jan. 15, 2014 issued by the European Patent Office in counterpart European Application No. 10 800 031.6.
Communication dated Apr. 22, 2014, issued by the State Intellectual Property Office of the People's Republic of China in counterpart Chinese Application No. 201080032096.X.
Communication issued Jul. 13, 2015, issued by the State Intellectual Property Office of the People's Republic of China in counterpart Chinese Patent Application No. 201080032096.X.

* cited by examiner

| ELEMENT | VALUE |
|---|---|
| application_type | 0x1000 –Browser<br>0x1001 –Widget |
| application_control_code | AUTOSTART<br>PRESENT<br>DESTROY<br>KILL<br>PREFETCH<br>REMOTE<br>REMOVE |
| application_identifier | organization_id (32bits)<br>application_id (16bits) |
| descriptor | application_descriptor |
|  | transport_protocol_descriptor |
|  | OHTV_application_location_descriptor |

FIG. 3

| code | identifier |
|---|---|
| 0x00 | Reserved |
| 0x01 | AUTOSTART |
| 0x02 | PRESENT |
| 0x03 | DESTROY |
| 0x04 | KILL |
| 0x05 | PREFETCH |
| 0x06 | REMOTE |
| 0xTBD | REMOVE |
| 0x07~0xFF | Reserved |

FIG. 4

| ELEMENT | VALUE |
|---|---|
| protocol_id | 0x0003 – Transport via HTTP<br>0xA000 – Transport via NRT |
| selector_byte | N1 |

FIG. 5

| SYNTAX | Bits |
|---|---|
| for(i=0; i<N; i++){ | |
| URL_base_length | 8 |
| for(j=0; j<N; j++){ | |
| URL_base_byte | 8 |
| } | |
| URL_extension_count | 8 |
| for(j=0; j<URL_extension_count; j++){ | |
| URL_extension_length | 8 |
| for(k=0; k<URL_extension_length; k++){ | |
| URL_extension_byte | 8 |
| } | |
| } | |
| } | |

FIG. 6

| SYNTAX | Bits |
|---|---|
| ohtv_application_location_descriptor(){ | |
| descriptor_tag | 8 |
| descriptor_length | 8 |
| Version | 8 |
| for(i=0; i<N; i++){ | |
| initial_path_bytes | 8 |
| } | |
| } | |

FIG. 7

```xml
<?xml version="1.0" encoding="UTF-8"?>
<widget xmlns - "http://www.w3.org/ns/widgets"
xmlns:ohtv="urn:ohtv:widget:config:2010"
xmlns:private ="urn:user:ohtv:widget:private:2010"
id = 'http://example.org/exampeWidget"
    version    = "2.0 Beta'
    height     = "200"
    width      = "200"
    viewmodes = "application fullscreen">
  <name short="Example 2.0">   The example Widget!   </name>
  <feature name='http://example.com/camera">
    <param name="autofocus" value="true' />
  </feature>
  <preference name="apikey" value="ea31ad3a23fd2f" readonly ="true" />
  <description> A sample widget to demonstrate some of the possibilities. </description>
  <author href="http://foo-bar.example.org/"
        email="foo-bar@example.org">Foo Bar Corp</author>
  <icon src="icons/example.png"/>
  <icon src="icons/boo.png"/>
  <content src="index.html"/>
  <license>
Example license (based on MIT License)
Copyright (c) 2008 The Foo Bar Corp.
THE SOFTWARE IS PROVIDED "AS IS", WITHOUT WARRANTY OF ANY KIND, EXPRESS
OR IMPLIED, INCLUDING BUT NOT LIMITED TO THE WARRANTIES OF
MERCHANTABILITY, FITNESS FOR A PARTICULAR PURPOSE AND
NONINFRINGEMENT.
IN NO EVENT SHALL THE AUTHORS OR COPYRIGHT HOLDERS BE LIABLE FOR ANY
CLAIM, DAMAGES OR OTHER LIABILITY, WHETHER IN AN ACTION OF CONTRACT,
INSULT OR OTHERWISE, ARISING FROM, OUT OF OR IN CONNECTION WITH THE
SOFTWARE OR THE USE OR OTHER DEALINGS IN THE SOFTWARE.
  </license>
  <ohtv:childLock>true</ohtv:childLock>
  <ohtv:BoundaryList>
  <ohtv:location>http://www.example.com/movie</ohtv:location>
  <ohtv:location>http://www.youtube.com </ohtv:location>
  <ohtv:location>http://news.yahoo.com/rss</ohtv:location>
  </ ohtv:BoundaryList >
  <ohtv:UserDefine>
  <private:addtiondata>http://www.example.com/text.data </private:addtiondata>
  <private:myicons>Resource/image/bigicon.png </private:myicons >
  </ ohtv:UserDefine>
</widget>
```

METHOD AND APPARATUS FOR CLIENT CAPABLE OF ACCESSING BROADCASTING NETWORK AND INTERNET NETWORK TO RECEIVE APPLICATION

CROSS-REFERENCE TO RELATED PATENT APPLICATIONS

This application claims priority from Korean Patent Application No. 10-2010-0053030, filed on Jun. 4, 2010, in the Korean Intellectual Property Office, U.S. Provisional Application No. 61/225,314, filed on Jul. 14, 2009, and U.S. Provisional Application No. 61/302,595, filed on Feb. 9, 2010, the disclosures of which are incorporated by reference in their entireties.

BACKGROUND

1. Field

Methods and apparatuses consistent with exemplary embodiments relate to receiving a predetermined application, and more particularly, to a method and apparatus for a client capable of accessing both a broadcasting network and an Internet network to receive an application.

2. Description of the Related Art

As broadcasting and communication are increasingly merged together, consumer demand for technologies that access high-resolution broadcasting video, high-quality broadcasting audio, and Internet-based services is increasing.

To access various Internet-based services through a television (TV), a method and apparatus for dynamically installing and deleting applications, which are for using the Internet-based services, in and from TV may be required.

SUMMARY

Exemplary embodiments provide a method and apparatus for a client capable of accessing both a broadcasting network and an Internet network to receive an application, and a computer readable recording medium having embodied thereon a computer program for executing the method.

According to an aspect of an exemplary embodiment, there is provided a method of receiving a predetermined application at a client, the client connected to a broadcasting network and an Internet network, the method including: receiving information about the application from the broadcasting network; and receiving data for executing the application from one of the broadcasting network or the Internet network, based on the received information about the application.

The information about the application may include information that indicates whether the application is one of a first type of application that is executed through a browser included in the client or a second type of application that executes scripts received from a predetermined server, in the client.

The information about the application may include information that indicates whether the data for executing the application is received through at least one of the broadcasting network or the Internet network.

When the application is the first type, the information about the application comprises at least one of a uniform resource locator (URL) of a web document accessed through the Internet network for executing the application or a URL of a web document included in a broadcast stream.

When the application is the second type, the information about the application comprises at least one of a URL of a server which provides resources and scripts for executing the application through the Internet network or a URL of the resources and scripts included in the broadcast stream.

When the application is the second type application, the data for executing the application further includes resources and scripts for executing the application, and information for setting an execution environment of the application.

The information for setting the execution environment of the application may include information about viewing restrictions of the application.

The information for setting the execution environment of the application may include lists of web pages accessible through the application.

The information for setting the execution environment of the application may include information about an execution environment defined by at least one of a manufacturer of the client or a service provider.

According to another aspect of an exemplary embodiment, there is provided a client apparatus, connected to a broadcasting network and an Internet network, that receives an application, the apparatus including: an application information receiver that receives information about the application from the broadcasting network; and an application receiver that receives data for executing the application from one of the broadcasting network or the Internet network, based on the received information about the application.

According to an aspect of another exemplary embodiment, there is provided a computer readable recording medium having embodied thereon a computer program, which when executed by a computer causes the computer to execute a method of receiving a predetermined application at a client, the client connected to a broadcasting network and an Internet network, the method including: receiving information about the application from the broadcasting network; and receiving data for executing the application from one of the broadcasting network or the Internet network, based on the received information about the application.

BRIEF DESCRIPTION OF THE DRAWINGS

The above and other aspects will become more apparent by describing in detail exemplary embodiments with reference to the attached drawings in which.

DETAILED DESCRIPTION

Hereinafter, exemplary embodiments will be described more fully with reference to the accompanying drawings.

Figure 1:
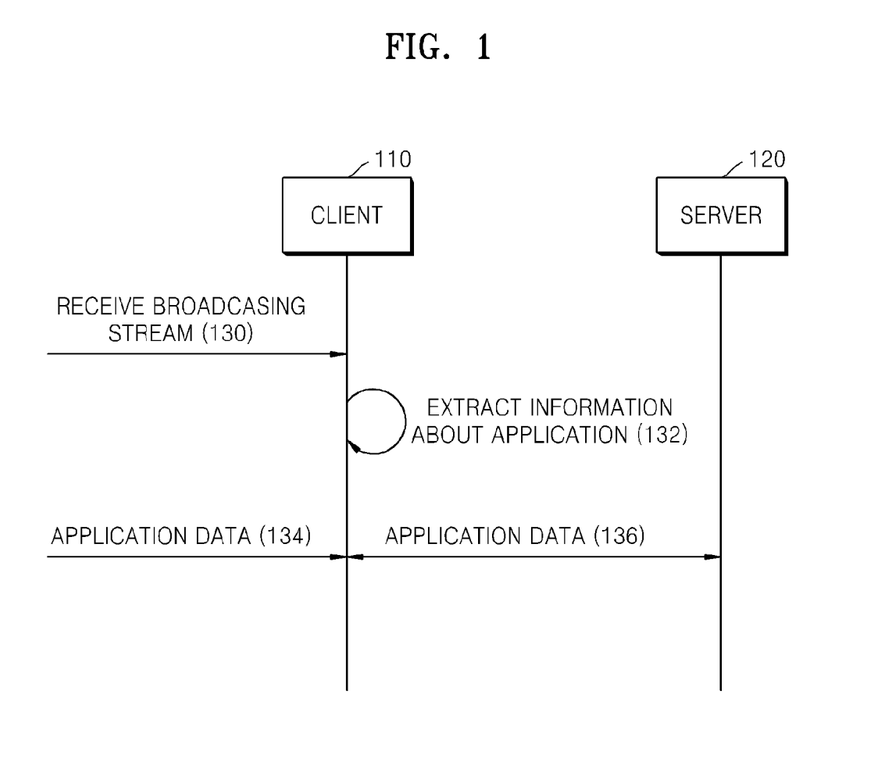
FIG. 1 is a flowchart illustrating a method for a client to receive an application, according to an exemplary embodiment.

FIG. 1 is a flowchart illustrating a method for a client 110 to receive an application, according to an exemplary embodiment.

Referring to FIG. 1, the client 110 is a device that may access both a broadcasting network and an Internet network. The client 110 may be a television (TV) that receives a broadcast stream through a broadcasting network, decodes the received broadcast stream, and reproduces the broadcast stream. The client 110 may receive a broadcast stream by accessing a broadcasting network through a broadcasting interface and access the Internet through an Internet interface. The broadcasting interface may be an interface that receives a broadcast stream (for example, Moving Pictures Expert Group —transport stream (MPEG-TS)) by accessing a broadcasting network through a coaxial cable. The Internet interface may be a wired local area network (LAN) interface or a wireless LAN interface.

A server 120 is a device that provides an application to the client 110. The server 120 may be operated by a broadcasting station that transmits a broadcasting signal or a manufacturer of the client 110. To provide various services, in addition to a broadcasting service, the server 120 provides an application relating to the services.

In operation 130, the client 110 receives a broadcast stream through a broadcasting interface connected to a broadcasting network. The broadcasting network is configured to allow broadcast viewing in real time and bidirectial communication. The broadcasting network may be a broadcasting network that supports an Advanced Television Standards Committee-non-real time (ATSC-NRT) service.

Accordingly, the broadcast stream received through the broadcasting network may include information about bidirectional data communication, in addition to video and audio data for real-time broadcasting. Thus, the broadcast stream received in the client 110 in operation 130 may include information about an application executed in the client 110. The application may be an application related to a channel currently being viewed by a user or an application irrespective of a channel. The information about the application may include information about a type of application, information about a method of transmitting the application, and information about a uniform resource locator (URL) of the application, and will be described more fully with reference to the drawings.

In operation 132, the client 110 extracts the information about the application included in a broadcasting signal received in operation 130. As an example of a multimedia home platform (MHP), the client 110 determines a stream type defined in a program map table (PMT) of the broadcasting signal. When the stream type is "MPEG2 Private Section (0x05)" and "Application signaling descriptor (0x6F)" exists in the PMT, it is understood that the stream includes information about an application. Accordingly, the client 110 acquires a packet identifier (PID) for an application information table (AIT), which is the information about the application, through the PMT and extracts a packet of a corresponding PID from the received broadcast stream, thereby extracting the AIT included in the broadcasting signal.

Figure 2:
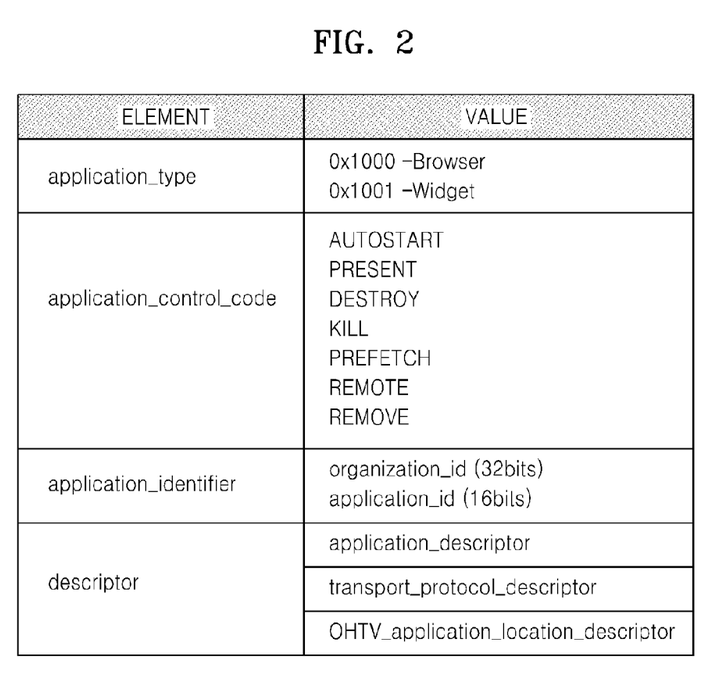
FIG. 2 illustrates information about an application, according to an exemplary embodiment.

FIG. 2 illustrates the information about the application, according to an exemplary embodiment.

Referring to FIG. 2, the information about the application may include a type of application, application control codes, application identifiers, and application descriptors.

The type of application, that is "application_type", is information indicating whether the application is a browser based type application executed through a browser included in the client 110 or a widget based type application executed in the client 110 by receiving both resources and scripts from the server.

The browser based type application is executed by displaying web documents through the browser included in the client 110. The web documents received from outside of the client 110 are displayed through the browser, thereby executing the application.

The widget based type application is executed based on resources and scripts used to execute the application received as one package. The scripts may be Java Script for executing the application or scripts prepared by using Hypertext Markup Language (HTML).

The browser based application is executed by downloading the web documents through the browser on the assumption that the client 110 includes a predetermined browser. The widget based application is executed by downloading all resources and scripts in the client 110 regardless of inclusion of a browser in the client 110 or closure of the browser. The client 110 may include an engine (for example, a Java virtual machine) for interpreting and executing scripts and may not include a separate browser. Also, as the resources and scripts are all downloaded and then the application is independently executed, data relating to execution of the application may not be continuously received from the outside.

Figure 3:
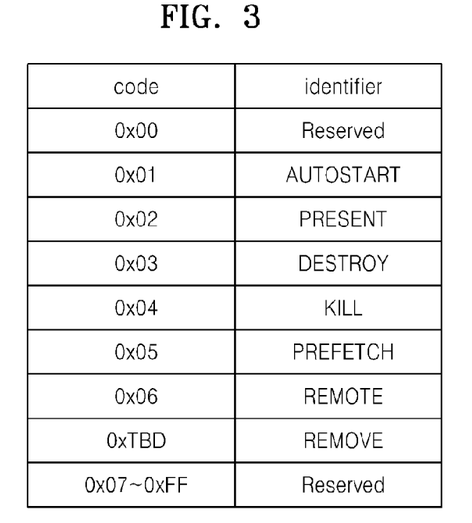
FIG. 3 illustrates control codes, according to an exemplary embodiment.

The application control codes, that is, "application_control_code", define a control operation of an application and are described more fully with reference to FIG. 3.

FIG. 3 illustrates the control codes, according to an exemplary embodiment.

Referring to FIG. 3, "AUTOSTART" denotes a control for automatically executing an application when execution of the application is ready. "KILL" denotes a control for stopping or completing an application that is being prepared for execution or currently being executed. "REMOVE" is a control for removing an application currently stored in the client 110. When the client 110 receives the control code "REMOVE", a corresponding application is removed. "PREFETCH" is a control for executing an application in advance when installation of basic files for executing an application is completed, even before reception and installation of the application is not completed.

The application identifiers, that is, "application_identifier", are information for identifying an application. As an identifier for an organization providing an application, "organization_id" is defined. As an identifier for an application itself, "application_id" is defined.

The application descriptor, that is "descriptor", includes "application_descriptor", "transport_protocol_descriptor", and "OHTV_application_location_descriptor". The "application_descriptor" describes general characteristics of an application, the "transport_protocol_descriptor" defines a transport protocol of an application, and "OHTV_application_location_descriptor" defines a URL of an application. The "application_descriptor" defines general characteristics, such as a profile, a version, an execution priority, a name, an icon, an authorization, and the like.

Figure 4:
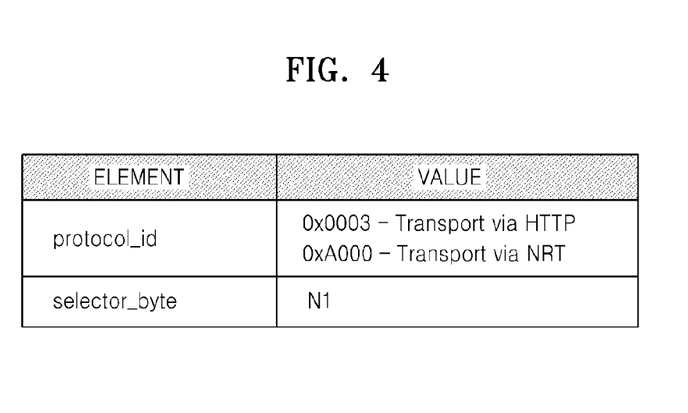
FIG. 4 illustrates information about a transport protocol of an application, according to an exemplary embodiment.

FIG. 4 illustrates information about a transport protocol of an application, according to an exemplary embodiment.

Referring to FIG. 4, the information about the application extracted in operation 132 may include information about a transport protocol of the application. As described above, the client 110 may access both the broadcasting network and the Internet network. Accordingly, the application may be received through the two networks. The application included in the broadcasting signal received through the broadcasting network may be received or the application may be requested and received through the Internet network.

Accordingly, a network through which the application may be received by the client 110 from among a plurality of networks may be identified and thereby, the information about the application included in the broadcasting signal and received in operation 130 may include the information about the transport protocol of the application.

In FIG. 4, the value of "protocol_id" being "0x0003" indicates that the application is transported to the client 110 through the Internet network. In this case, a hypertext transfer protocol (HTTP) is used. Also, the value of "protocol_id" being "0xA000" indicates that the application is transported to the client 110 through the broadcasting network. In this case, an ATSC-NRT service is used. The application is transported and received through the broadcast stream including data relating to the application.

In order to receive the application, information about a URL of the application may be identified. When the application is received through the Internet network, a URL of the server 120 that provides the application is needed. When the application is received through the broadcast stream, a URL for extracting data relating to the application from the broadcast stream is needed. In FIG. 4, "selector_byte" defines such a URL of the application.

Figure 5:
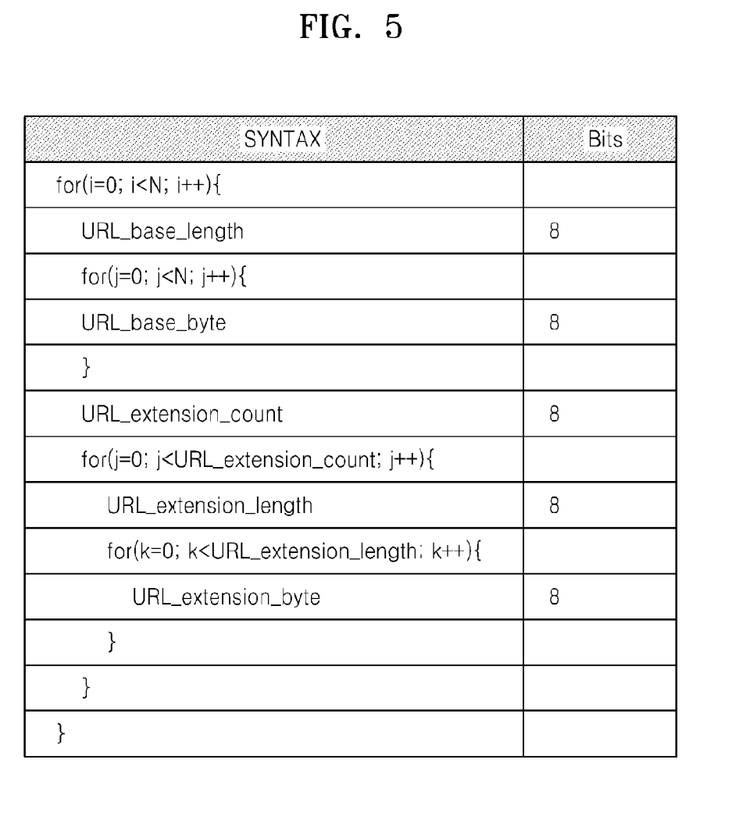
FIG. 5 illustrates syntax for generating information about a uniform resource locator (URL) of an application, according to an exemplary embodiment.

FIG. 5 illustrates syntax for generating information about a URL of an application, according to an exemplary embodiment.

Referring to FIG. 5, "selector_byte" includes a URL of a server, which may provide an application or a URL for extracting an application from a broadcast stream. When the application is provided through the Internet network, a URL of a server, which may provide the application, is included in "selector_byte." When the application is provided through the broadcasting network, a URL for extracting the application from the broadcast stream is included in "selector_byte". The information about a URL of an application is defined by elements, such as "URL_base_length", "URL_base_byte", "URL_extension_length" and "URL_extension_byte".

"URL_base_length", that is, a length of information about a URL, is defined and "URL_base_byte", that is, information about a URL, is defined. When the application is received through an Internet network, "URL_base_byte" defines a URL of a server. When the application is received through a broadcasting network, "URL_base_byte" defines a URL for extracting the application from a broadcast stream.

For example, a web page address "http://xxx.xx.xx/" that is an address of a server that provides an application may be "URL_base_byte" and an address "nrt://{atsc_tsId}.{subnet_id}.{nrt_service_id}/" according to an ATSC-NRT service, which is information for extracting the application from a broadcast stream, may be "URL_base_byte". Here, "atsc_tsId" in a broadcasting signal is a stream identifier of a channel that is currently viewed by a user, "subnet_id" is an identifier of a program that is currently viewed by a user, and "nrt_service_id" is an identifier for specifying a service that provides the application from the ATSC-NRT service.

As a length of "URL_base_byte" is limited, basic information about a URL may be only defined as "URL_base_byte". For example, when a URL of a server that provides an application is "http://kbs.co.kr/ohtv/main/index.html", only "http://kbs.co.kr/" may be "URL_base_byte". Also, when the information for extracting an application from a broadcast stream is "nrt://{atsc_tsId}.{subnet_id}.{nrt_service_id}/{nrt_content_linkage}[/{file name}]", only "nrt://{atsc_tsId}.{subnet_id}.{nrt_service_id}/" may be "URL_base_byte". "nrt_content_linkage" is information for specifying data relating to an application from among various data provided through the ATSC-NRT service and "file name" is a file name of the application.

The remaining information except for information defined as "URL_base_byte" in a URL of an application may be defined as "URL_extension_byte" or may be included in "OHTV_application_location_descriptor", which will be described later with reference to FIG. 6.

Figure 6:
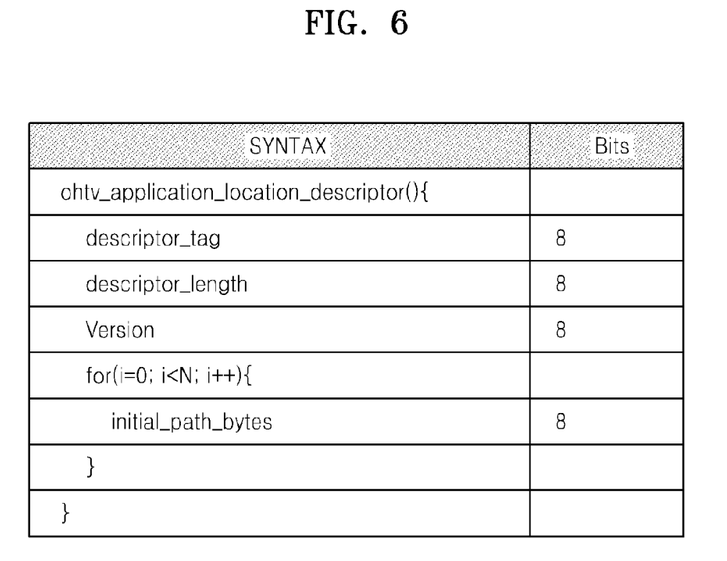
FIG. 6 illustrates syntax for generating a detailed descriptor of an application, according to an exemplary embodiment.

FIG. 6 illustrates syntax for generating a detailed descriptor of an application, according to an exemplary embodiment.

Referring to FIG. 6, detailed information about a URL of an application, "OHTV_application_location_descriptor" includes "descriptor_tag", "descriptor_length", "Version", and "initial_path_bytes".

"descriptor_tag" denotes a tag for specifying "OHTV_application_location_descriptor". "descriptor_length" denotes a length of "OHTV_application_location_descriptor" except for "descriptor_tag" and "descriptor_length".

"Version" denotes version information about an application. "Version" is information starting from "1" and increases by "1" as the version of the application changes, and may be referred to when the client 110 determines whether the application should be updated. The maximum value of 8 bit information is "255". After "255", when the version of the application is again changed, the value restarts from "1".

"initial_path_bytes" defines information from among information about a location of the application, except for the information included in "URL_base_byte".

When the application is provided through an Internet network and a URL of a server that provides an application is "http://kbs.co.kr/ohtv/main/index.html", if "http://kbs.co.kr/" is "URL_base_byte", the remaining address, "ohtv/main/index.html" may be "initial_path_bytes".

Contents of "initial_path_bytes" may vary according to the type of the application. When the application is a browser based application, "initial_path_bytes" may be "ohtv/main/index.html", the URL of a web document displayed through a browser. However, when the application is a widget based application, "initial_path_bytes" may be "ohtv/main/kbs_unbound.wgt", the URL of the server that may download a widget.

Also, when the application is provided through a broadcasting network and the information for extracting the application from a broadcast stream is "nrt://{atsc_tsId}.{subnet_id}.{nrt_service_id}/{nrt_content_linkage}[/{file name}]", if "nrt://{atsc_tsId}.{subnet_id}.{nrt_service_id}/" is "URL_base_byte", the remaining information, "{nrt_content_linkage}[/{file name}]" may be "initial_path_bytes".

Similar to when the application is provided through an Internet network, contents of "initial_path_bytes" may vary according to the type of the application. When the application is a browser based application, "initial_path_bytes" may be "AABBCCDD/index.html", the web document included in a broadcast stream. "AABBCCDD" is "nrt_content_linkage" and "index.html" is "file_name". However, when the application is a widget based application, "initial_path_bytes" may be "AABBCCDD/kbs_unbound.wgt," which indicates data relating to the widget included in a broadcast stream.

Referring back to FIG. 1, the client 110 receives data for executing an application based on the information about an application extracted in operation 132, in operations 134 and 136. Data for executing an application is received through a broadcasting network, as in operation 134, or the server 120 is requested for data for executing an application through an Internet network and data is received in response to the request, as in operation 136.

In operation 134, the client 110 extracts data for executing an application from a broadcast stream received through a broadcasting network. The data for executing an application is extracted from a broadcast stream based on the URL of an application extracted in operation 132.

When an application is a browser based application, a web document included in a broadcast stream is extracted based on the URL of an application. When an application is a widget based application, an application package included in a broadcast stream is extracted. The application package includes resources and scripts for executing an application. Also, the application package may include information about an execution environment of an application, which will be described later with reference to FIG. 7.

In operation 136, the client 110 requests the server 120 for an application through an Internet network and receives the requested application. The application is requested and received based on the URL of the server 120 extracted in operation 132.

When an application is a browser based application, the server 120 is accessed according to the URL of the server 120 and the web document to be displayed through a browser is requested and received by using HTTP. When an application is a widget based application, the server 120 is accessed and the application package is requested and received.

The application package may include Cascading Style Sheets (CSS), a resource, a script, a firstly executed HTML file, and information about an execution environment.

The CSS defines a method of displaying objects that form an application. The resource includes all multimedia data that forms an application, such as an image, text, language, video, and audio, each of which is needed to execute the application.

The script denotes a code for executing an application based on the resource. As described above, the script may be Java Script or a script prepared by using HTML. Also, before execution of an application, the script may be a preview script indicating that a current state of the application is that the application may be executed. For example, when a user is watching a predetermined channel, the script may display a predetermined button, indicating that execution of an application relating to the channel is ready, on a television screen.

The firstly executed HTML file may be firstly processed according to the execution of the application.

Figure 7:
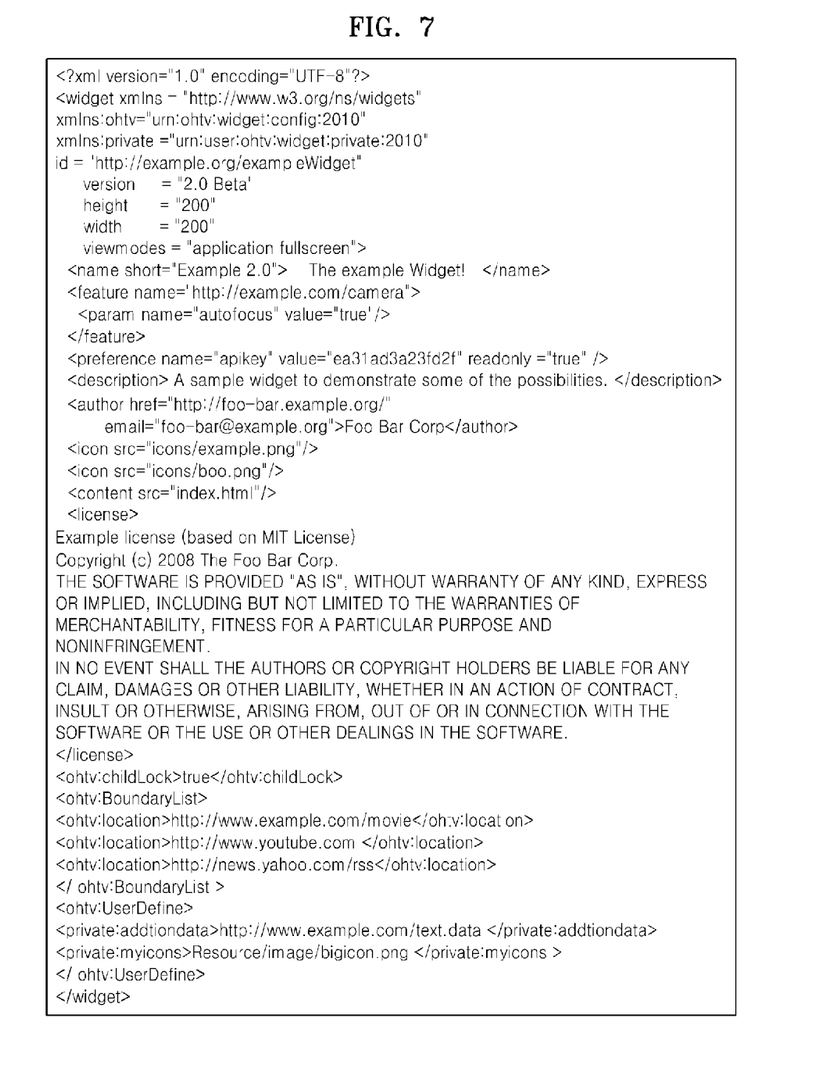
FIG. 7 illustrates information about an execution environment of an application, according to an exemplary embodiment.

FIG. 7 illustrates information about an execution environment of an application, according to an exemplary embodiment.

The application package includes not only the resource and the script, but also the information about an execution environment of an application, and thus may control execution of an application. The information about an execution environment of an application may include a size of a screen for executing an application, a name of an application, and contents relating to an author and license.

Also, the information about an execution environment of an application may include a "childlock" tag and information about viewing restrictions, so that access of under-aged teenagers to an application including adult contents may be prohibited. A "BoundaryList" tag is included in the information about an execution environment of an application, so that only web pages previously defined in the tag may be accessed through the application. A "UserDefine" tag may include information about an execution environment of an application freely defined by a manufacturer of the client 110 or a service provider who provides broadcasting services.

Figure 8:
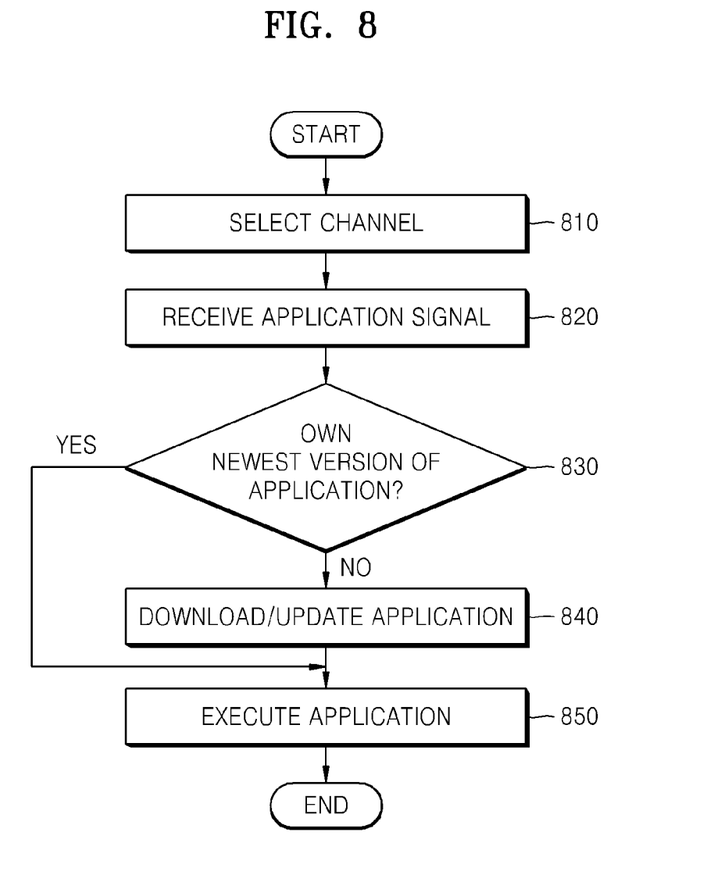
FIG. 8 is a flowchart illustrating a method of receiving an application, according to another exemplary embodiment.

FIG. 8 is a flowchart illustrating a method of receiving an application, according to another exemplary embodiment.

Referring to FIG. 8, a user of the client 110 selects a channel in operation 810. The channel is selected by controlling a channel of the client 110, which may be a TV.

The client 110 receives an application signal of the selected channel, in operation 820. Information about the application is extracted from a broadcast stream of the selected channel. The information about an application described with reference to FIGS. 2 through 6 is extracted from a broadcast stream.

In operation 830, the client 110 determines whether the client 110 currently owns the newest version of the application based on the information about the application extracted in operation 820. Whether the application currently installed in the client 110 is the newest version of the application is determined based on information about the version of the application included in the information about the application extracted in operation 820.

As a result of determination, when the newest version of the application is previously installed, the application is executed and completed in operation 850. However, when it is determined that the newest version of application is not installed, data for executing the application is received and the application is updated, in operation 840.

The data for executing the application may be received through a broadcasting network or an Internet network. When the application is a browser based application, a predetermined web document is received through a broadcasting network or an Internet network. When the application is a widget based application, an application package including resources, scripts, and information about an execution environment is received through a broadcasting network or an Internet network.

Figure 9:
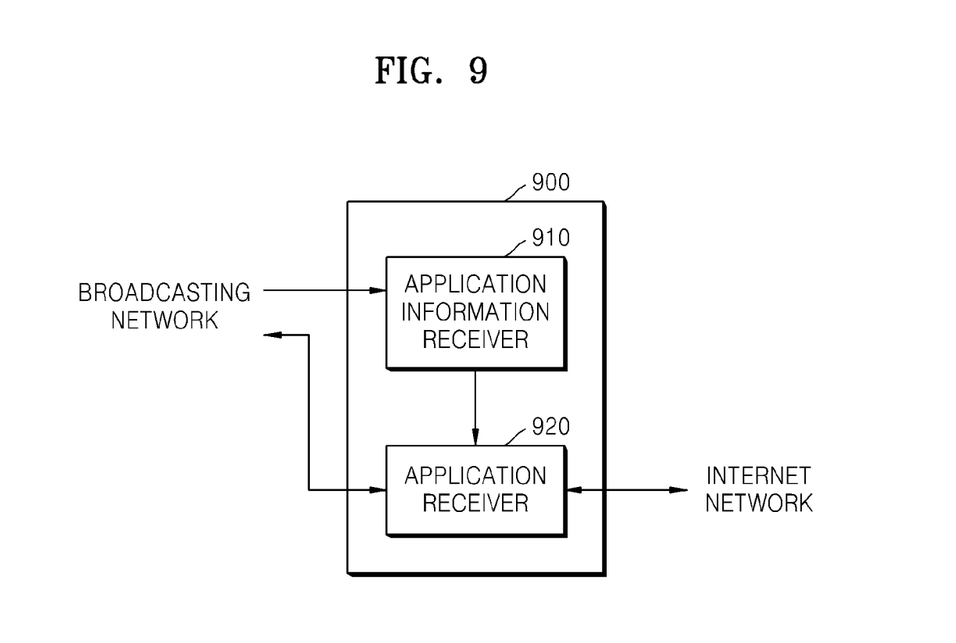
FIG. 9 is a block diagram of an apparatus for receiving an application, according to an exemplary embodiment.

FIG. 9 is a block diagram of an apparatus 900 for receiving an application, according to an exemplary embodiment.

Referring to FIG. 9, the apparatus 900 for receiving an application according to the current exemplary embodiment includes an application information receiver 910 and an application receiver 920.

The application information receiver 910 receives information about an application through a broadcasting network. The information about an application included in a broadcast stream received through a broadcasting network is extracted from the broadcast stream. The information about an application may include the information described above with reference to FIGS. 2 through 6.

The application receiver 920 receives data for executing an application based on the information about the application extracted by the application information receiver 910. The data for executing an application is received through a broadcasting network or an Internet network based on a URL of the application included in the information about the application. The URL of the application may be a URL of a server which may receive the application of a URL for extracting the application from a broadcast stream.

When the application is a browser based application, the data for executing the application may be a web document. When the application is a widget based application, the data for executing the application may be an application package including resources, scripts, and information about an execution environment.

Figure 10:
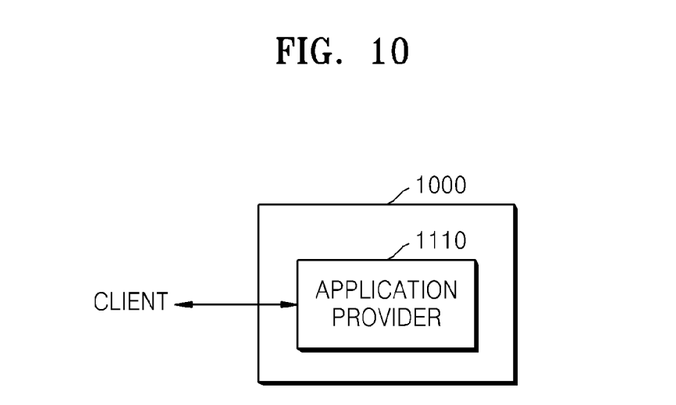
FIG. 10 is a block diagram of an apparatus for providing an application, according to an exemplary embodiment.

FIG. 10 is a block diagram of an apparatus 1000 for providing an application, according to an exemplary embodiment.

Referring to FIG. 10, the apparatus 1000 for providing an application according to the current exemplary embodiment includes an application provider 1110.

The application provider 1110 transmits data for executing an application to the client 110 through a broadcasting network or an Internet network. When the client 110, which receives the information about the application through a broadcasting network, requests the data for executing the application through the Internet network according to HTTP, the data for executing the application is transmitted to the client 110 through an Internet network.

The data for executing the application may be included in a broadcast stream and transmitted to the client 110. The data for executing the application is multiplexed in a broadcast stream and is broadcast. The client 110 may extract the data for executing the application from the broadcast stream based on the information about the application.

The data for executing the application provided by the apparatus 1000 for providing an application may be a web document that is a browser based application or an application package that is a widget based application.

The apparatus 900 for receiving an application and the apparatus 1000 for providing an application according to the embodiments of the present invention may each include a bus coupled with units of the apparatuses illustrated in FIGS. 9 and 10 and at least one processor combined with the bus. Also, in order to store commands, received messages, or generated messages, the apparatus 900 for receiving an application and the apparatus 1000 for providing an application may further include a memory, such as a read-only memory (ROM), random access memory (RAM), or flash memory, coupled with the at least one processor for executing commands, by being combined with the bus.

According to the exemplary embodiments, an application may be received by using various methods based on information about the application received through a broadcasting network, and executed so that various services, in addition to watching broadcasting, may be used in the client.

The computer readable recording medium is any data storage device that can store data, which can be thereafter read by a computer system, such as computer readable codes and instructions. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the exemplary embodiments have been particularly shown and described, it will be understood by those of ordinary skill in the art that various changes in form and details may be made therein without departing from the spirit and scope of the inventive concept as defined by the following claims.

What is claimed is:

1. A method of receiving an application at a client, the method comprising:
establishing a connection with a broadcasting network and an Internet network;
receiving information about the application through the broadcasting network; and
receiving data for executing the application from at least one of the broadcasting network and the Internet network, based on the received information about the application,
wherein the information about the application received via the broadcast comprises information about a type of application executable in the client, information about a method of transmitting the application, and information about a location of the application, and the information about the method of transmitting the application comprises information indicating whether the application is transported to the client through the broadcasting network or the application is transported from a server to the client through the Internet network.

2. The method of claim 1, wherein the information about the application comprises information that indicates whether the application is one of a first type of application that is executed through a browser included in the client and a second type of application that executes scripts received from a predetermined server, in the client.

3. The method of claim 2, wherein the information about the application comprises information that indicates whether the data for executing the application is received through at least one of the broadcasting network and the Internet network.

4. The method of claim 3, wherein the application is the first type, and the information about the application comprises at least one of a uniform resource locator (URL) of a web document accessed through the Internet network for executing the application and a URL of a web document included in a broadcast stream.

5. The method of claim 3, wherein the application is the second type, and the information about the application comprises at least one of a URL of a server which provides resources and scripts for executing the application through the Internet network and a URL of the resources and scripts included in the broadcast stream.

6. The method of claim 5, wherein the data for executing the application comprises information for setting an execution environment of the application.

7. The method of claim 6, wherein the information for setting the execution environment of the application comprises information about viewing restrictions of the application.

8. The method of claim 6, wherein the information for setting the execution environment of the application comprises lists of web pages accessible through the application.

9. The method of claim 6, wherein the information for setting the execution environment of the application comprises information about an execution environment defined by at least one of a manufacturer of the client and a service provider.

10. A client apparatus for receiving an application, the client apparatus comprising:
an application information receiver configured to receive information about the application through a broadcasting network; and
an application receiver configured to receive data for executing the application from at least one of the broadcasting network and an Internet network, based on the received information about the application,
wherein the client apparatus is connected to the broadcasting network and the Internet network, and the information about the application received via the broadcast comprises information about a type of application executable in the client apparatus, information about a method of transmitting the application, and information about a location of the application, and the information about the method of transmitting the application comprises information indicating whether the application is transported to the client through the broadcasting network or the application is transported from a server to the client through the Internet network.

11. The client apparatus of claim 10, wherein the information about the application comprises information that indicates whether the application is one of a first type of application that is executed through a browser included in the client apparatus and a second type of application that executes scripts received from a predetermined server, in the client apparatus.

12. The client apparatus of claim 11, wherein the information about the application comprises information that indicates whether the data for executing the application is received through at least one of the broadcasting network and the Internet network.

13. The client apparatus of claim 12, wherein the application is the first type, and the information about the application comprises at least one of a uniform resource locator (URL) of a web document accessed through the Internet network for executing the application and a URL of a web document included in a broadcast stream.

14. The client apparatus of claim 12, wherein when the application is the second type, and the information about the application comprises at least one of a URL of a server which provides resources and scripts for executing the application through the Internet network or a URL of the resources and scripts included in the broadcast stream.

15. The client apparatus of claim 14, wherein the data for executing the application comprises information for setting an execution environment of the application.

16. The client apparatus of claim 15, wherein the information for setting the execution environment of the application comprises information about viewing restrictions of the application.

17. The client apparatus of claim 15, wherein the information for setting the execution environment of the application comprises lists of web pages accessible through the application.

18. The client apparatus of claim 15, wherein the information for setting the execution environment of the application comprises information about an execution environment defined by at least one of a manufacturer of the client and a service provider.

19. A non-transitory computer readable recording medium having embodied thereon a computer program, which when executed by a computer causes the computer to execute a method of receiving an application at a client, the method comprising:

establishing a connection with a broadcasting network and an Internet network;

receiving information about the application through the broadcasting network; and receiving data for executing the application from at least one of the broadcasting network and the Internet network, based on the received information about the application, wherein the information about the application received via the broadcast comprises information about a type of application executable in the client, information about a method of transmitting the application, and information about a location of the application, and the information about the method of transmitting the application comprises information indicating whether the application is transported to the client through the broadcasting network or the application is transported from a server to the client through the Internet network.

* * * * *